June 23, 1953 — E. D. HEISEY — 2,642,793
ATTACHMENT FOR HAY BALERS FOR DISTRIBUTING
CHEMICALS THROUGH HAY DURING BALING
Filed Aug. 23, 1950 — 2 Sheets-Sheet 1
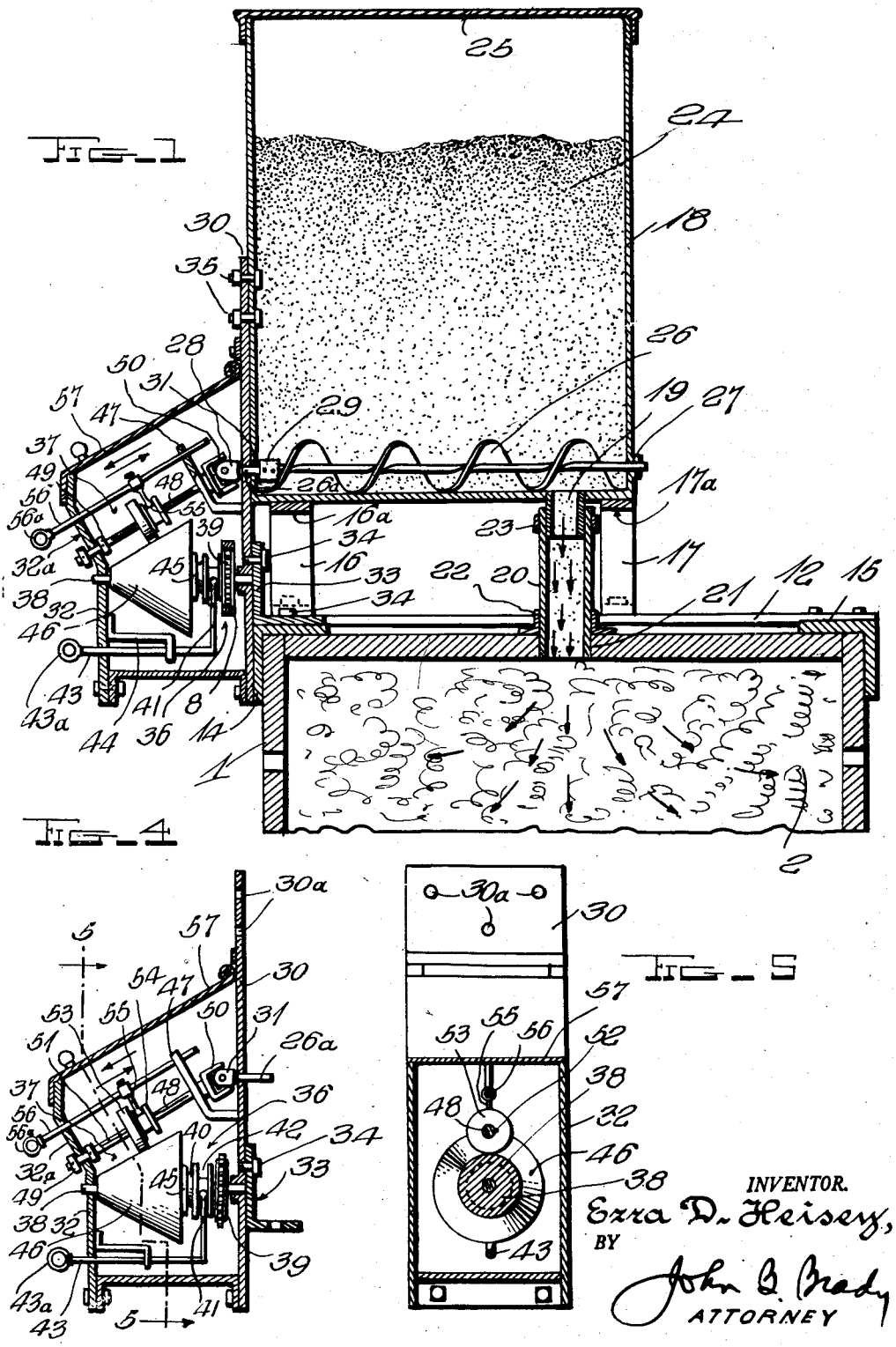
INVENTOR.
Ezra D. Heisey,
BY John B. Brady
ATTORNEY

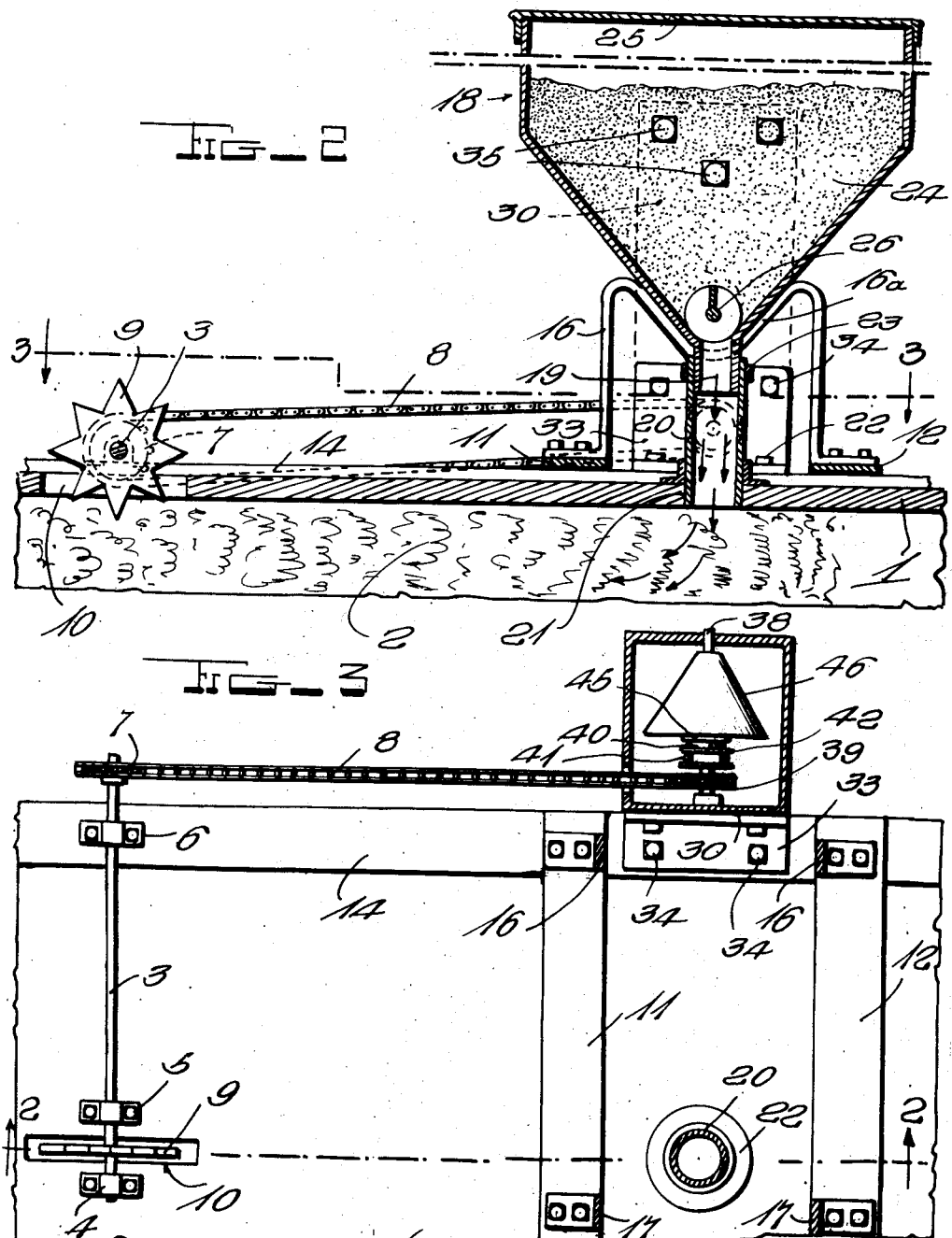

Patented June 23, 1953

2,642,793

UNITED STATES PATENT OFFICE 2,642,793

ATTACHMENT FOR HAY BALERS FOR DISTRIBUTING CHEMICALS THROUGH HAY DURING BALING

Ezra D. Heisey, Washington, Pa.

Application August 23, 1950, Serial No. 181,039

2 Claims. (Cl. 99—235)

My invention relates broadly to attachments for hay balers and more particularly to an attachment for sprinkling chemicals on the hay as the hay is baled for the purpose of making the hay more edible for cattle.

One of the objects of my invention is to provide a construction of attachment for hay balers whereby chemicals for improving the edible qualities of the hay for cattle may be distributed through the hay as it is baled at a controlled rate to insure the proper distribution of the chemicals to meet certain specified requirements for the feeding of cattle.

Another object of my invention is to provide a construction of attachment which may be readily applied to conventional hay balers and operated by the advancing hay through the baler with means on the attachment for controlling the rate at which chemicals may be distributed through the hay for insuring the most efficient distribution of the chemicals through the hay to meet specified feeding requirements for cattle.

Still another object of my invention is to provide a construction of attachment for balers which is driven by the movement of the hay toward the baling chamber, for distributing chemicals through the hay as it is baled including means forming part of the attachment for increasing or decreasing the rate at which the chemical is distributed through the hay as it is baled independently of the speed at which the hay is moved to the baling chamber of the baler.

Still another object of my invention is to provide an attachable unit for hay balers for the distribution of chemicals to hay while it is being baled where the unit is readily controllable to wholly discontinue the feeding of chemicals to the hay at selected times and to selectively control the rate at which the chemicals are distributed to the hay at other selected times.

Other and further objects of my invention reside in a simplified and practical unit which may be readily mounted on the conventional chamber for controlling the rate of distribution of chemicals to hay as it is being baled as set forth more fully in the specification hereinafter following by reference to the accompanying drawings in which:

Figure 1 is a transverse vertical sectional view through the chemical distribution unit of my invention showing the unit mounted upon a hay baler and illustrating the speed control means for governing the distribution of the chemicals to the hay as it is baled, certain of the parts being illustrated in elevation; Fig. 2 is a longitudinal sectional view taken through the attachment of my invention mounted upon a hay baler and illustrating particularly the manner of distributing the chemicals to the hay as the hay moves toward the baling chamber of the baler, the view being taken substantially on line 2—2 of Fig. 3; Fig. 3 is a horizontal sectional view of a fragmentary portion of the baler and the attachment of my invention, the view being taken substantially on line 3—3 of Fig. 2; Fig. 4 is a vertical sectional view through the speed control unit for the chemical distributor showing the speed control unit before it is applied to the baler and detached from the hopper, the parts of the unit being shown in elevation and Fig. 5 is a vertical sectional view taken substantially on line 5—5 of Fig. 4.

My invention is directed to the construction of an attachment for hay balers which may be readily applied to conventional hay balers for distributing chemicals through the hay as it is being baled for improving the edible qualities thereof in the feeding of cattle where the distribution of the chemicals may be readily cut off or where the rate at which the chemicals are distributed may be readily controlled for predetermining the quantity of chemicals supplied to any particular run of hay as it is being baled.

Referring more particularly to the drawings, reference character 1 designates the intake end of the conventional baling chamber of a hay baler through which the hay 2 is being moved under control of a reciprocating ram. A shaft 3 is journaled transversely of the frame 1 of the hay baler on brackets 4, 5 and 6 and extends upon one end of the frame 1 and carries a sprocket wheel 7 thereon which is engaged by sprocket chain 8. The shaft 3 has a star wheel 9 thereon projecting through a longitudinally disposed slot 10 in frame 1 and engaged by the hay 2 as it moves toward the baling chamber thereby imparting clockwise rotation to the star wheel 9 driving shaft 3 in a clockwise direction and correspondingly imparting movement to the sprocket chain 8.

The attachment of my invention comprises two coacting parts which are assembled as a unit by a pair of transverse parallel extending spaced bars 11 and 12 which are secured at opposite ends to the frame members 14 and 15 of the baler frame 1. The transverse bars 11 and 12 serve as supports for a pair of standards 16 and 17. Standards 16 and 17 are each provided with a pair of spaced feet and central substantially V-shaped pocketlike portions 16a and 17a. A hopper 18 having a substantially rectangular body portion and tapering to a substantially V-shaped bottom portion is seated or mounted in the substantially V-shaped pocketlike portions 16a and 17a of the standards 16 and 17 with the spout or outlet of the hopper 18 as shown at 19 extending into a tube 20 which extends downwardly through an aperture 21 in the top of the baler frame 1. Tube 20 is secured to baler frame 1 through flange 22 at its lower end and at its upper end tube 20 is secured to spout 19 by means of band 23. The hopper 18 receives the chemical in the form of a powder represented in bulk at 24 which is supplied to the hopper 18 through removable top 25 from time to time. This powder may be any form of chemical which aids the digestion of the cattle consuming the hay. I have utilized salt for this purpose although it will be understood that various chemicals may be used in the apparatus of my invention. Because of the nature of the chemical there is a tendency for the powder to cake and clog the parts of the feed and to avoid this tendency I introduce a traveling screw or auger 26 at the substantially V-shaped bottom of the hopper 18.

The traveling screw or auger 26 has oppositely projecting shaftlike ends which are journaled at opposite ends in the side walls of hopper 18 as represented at 27 and 28 and confined in position by collar 29. The shaftlike end of the traveling screw or auger 26 projects through one end of hopper 18 as represented more clearly in Fig. 1 and through the vertically extending attachment plate 30 and is provided on the end thereof with a yoke connection shown at 31 disposed within the enclosed housing represented at 32. The attachment plate 30 is provided adjacent its lower end with a transversely extending angle member 33 which seats upon and is connected to the frame member 14 of the baler frame 1 and is secured thereto by detachable bolt member 34. The upper end of plate member 30 is detachably connected with the upper portion of the hopper 18 by detachable bolt members 35 which pass through the side wall of hopper 18 and through apertures 30a in plate member 30. Thus the housing 32 formed in part by plate member 30 serves as a coupling means between the baler frame 1 and the hopper 18 and as a housing for the clutch and speed control mechanism for controlling the operation of the traveling screw or auger 26 in hopper 18.

The housing 32 forms an enclosure for both a clutch mechanism indicated generally at 36 and a speed control mechanism indicated generally at 37. The clutch control mechanism operates on shaft 38 which is journaled between plate member 30 and the front wall of the housing 32. Shaft 38 carries sprocket wheel 39 which is engaged by sprocket chain 8 extending from sprocket wheel 7 on shaft 3 which is driven, as heretofore explained, in a clockwise direction by the travel of the hay as the hay moves toward the sealing chamber under action of a reciprocating ram.

Shaft 38 drives the slidable clutch member 40 which is slidably keyed to revolve with shaft 38 and is displaceable linearly by the movement of yoke 41 engageable with the yoke ring 42 forming part of the clutch member 40. The yoke 41 is displaceable under control of hand lever 43 which is slidably mounted through the front wall of housing 32 and stabilized by bracket 44 thus enabling clutch member 40 to be moved toward or away from the coacting clutch member 45 which forms part of the frustroconical member 46 which is normally loosely mounted on shaft 38 and connected with clutch member 45. When, however, clutch member 40 is engaged with clutch member 45 the frustroconical driven member 46 is driven by shaft 38 under control of sprocket chain 8. The housing 32 is closed by a hinged protective lid 57 and has an interiorly arranged bracket 47 carried by plate member 30 and disposed at an angle thereto and forming a journaling means for the upper end of shaft 48. The lower end of shaft 48 is journaled in the outwardly inclined wall collars 32a of housing 32 and confined therein by limit collars 49. The upper end of shaft 48 carries yoke 50 which is coupled with yoke 31 on the end of stub shaft 26a which is coupled with the shaftlike end of screw conveyor or auger 26 by coupling sleeve 29. The yokes 31 and 50 constitute universal joint for driving the stub shaft 26a which is detachably connected through coupling sleeve 29 with conveyor 26.

The shaft 48 has a longitudinally extending key 51 formed therein extending throughout the length thereof into which coacts with a key or tongue 52 connected with the revolvable friction roller 53. Revolvable friction roller 53 has a collar 54 thereon which is engaged by yoke 55 extending from the rod member 56 which is slidable through the end of bracket 47 and the inclined wall portion 32a of housing 32 for adjusting the position of friction roller 53 with respect to the inclined surface of frustroconical member 46. As rod member 56 is drawn down the speed of rotation of the traveling screw or auger 26 is decreased. When the rod member 56 is pushed upwardly the speed of rotation of the traveling screw or auger 26 is increased. 43 and 56 are also manually controlled by hand grips 43a and 56a and by manipulating member 43a rotation of traveling screw or auger 26 may be wholly discontinued whereas by manipulating member 56a the speed of rotation of traveling screw or auger 26 may be accordingly controlled. The chemical powder is distributed through tube 20 and disseminates through the hay 2 as it is advanced toward the baling chamber as indicated by the arrows.

The standards 16 and 17 which are supported on the spaced bars 11 and 12 serve to brace hopper 18 in a transverse direction which is continuously subject to successive stresses due to the progressive movement of the baling ram. That is to say, the reciprocation of the baling ram results in successive pulses or vibration which are resisted by the structural shape of the hopper 18 entering between the V-shaped standards 16 and 17 transversely of the frame structure.

The standards 16 and 17 have a width which exceeds the width of the plate member 30 thereby insuring rigidity in the mounting of the hopper 18 with respect to the frame structure. Standard 17 is erected on bars 11 and 12 just beyond the central longitudinal axis of the baler frame 1 so that the hopper 18 extends slightly beyond the central longitudinal axis of the baler frame 1 enabling the discharge opening 19 to be located over the center of the baler frame 1. The passage through which the material 2 is progressively moved is accordingly symmetrically positioned on each side of the outlet of tube 20 enabling the chemical to be uniformly distributed through the material 2.

While I have described my invention in one of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. An apparatus for distributing chemical in material which is progressively moved to a baling position comprising in combination with a frame forming a passage for the material moving to a baling position, a supporting structure for said frame, a pair of horizontally extending spaced bars mounted at opposite ends on said supporting structure, a pair of spaced standards erected on said bars, a hopper for chemical material supported by said standards and spaced above said frame, a screw conveyor in said hopper, said hopper having a discharge connection leading to the passage for the conveyance of the material being baled, a plate member extending between one side of the supporting structure for said frame and one side of said hopper, means disposed in the path of movement of the material being baled for driving said conveyor, a housing carried by said plate member and means disposed within said housing and connected with said conveyor and driven by the aforesaid means comprising a horizontal shaft journalled in the lower portion of said housing below the plane of the bottom of said hopper and an angularly inclined shaft journalled in the upper portion of said housing, said horizontally disposed shaft having a frustroconical driven member associated therewith and said angularly inclined shaft having a friction roller adjustable in position thereon and contacting the surface of said frustroconical driven member and connection means between said angularly inclined shaft and the conveyor within the hopper for operating said conveyor and effecting movement of the chemical material through said discharge connection and into the material moving through the passage in said frame.

2. An apparatus for distributing chemical in material which is progressively moved to a baling position comprising in combination with a frame forming a passage for the material moving to a baling position, a supporting structure for said frame, a pair of horizontally extending spaced bars mounted at opposite ends on said supporting structure, a pair of spaced standards erected on said bars, a hopper for chemical material supported by said standards and spaced above said frame, a screw conveyor in said hopper, said hopper having a discharge connection leading to the passage for the conveyance of the material being baled, a plate member extending between one side of the supporting structure for said frame and one side of said hopper, means disposed in the path of movement of the material being baled for driving said conveyor, a housing carried by said plate member and means disposed within said housing and connected with said conveyor and driven by the aforesaid means comprising a horizontal shaft journalled in the lower portion of said housing below the plane of the bottom of said hopper and an angularly inclined shaft journalled in the upper portion of said housing, said shafts being disposed in a vertical plane coincident with a plane through the vertical axis of said hopper, said horizontally disposed shaft having a frustroconical driven member associated therewith and said angularly inclined shaft having a friction roller adjustable in position thereon and contacting the surface of said frustroconical driven member, connection means between said angularly inclined shaft and the conveyor within the hopper, clutching and declutching means associated with said lower shaft and with said frustroconical driven member, a manual control device extending exteriorly of said housing for controlling the operation of said clutching and declutching device and a manual control device disposed exteriorly of said housing for controlling the position of said friction roller with respect to said frustroconical driven member for varying the speed of said conveyor for operating said conveyor and effecting movement of the chemical material through said discharge connection and into the material moving through the passage in said frame.

EZRA D. HEISEY.

References Cited in the file of this patent

UNITED STATES PATENTS

| Number | Name | Date |
|---|---|---|
| 506,892 | Wiebe | Oct. 17, 1893 |
| 1,013,568 | Sharpe | Jan. 2, 1912 |
| 1,258,668 | Gauntt | Mar. 12, 1918 |
| 1,359,950 | Beauvais | Nov. 23, 1920 |
| 1,877,266 | Chapin et al. | Sept. 13, 1932 |
| 2,031,326 | Miller | Feb. 18, 1936 |
| 2,503,416 | Russell | Apr. 11, 1950 |
| 2,504,279 | Sanner | Apr. 18, 1950 |
| 2,567,760 | Boughan | Sept. 11, 1951 |